United States Patent [19]

Savoie

[11] 4,043,068
[45] Aug. 23, 1977

[54] ESCAPE HATCH FOR FISH NET

[76] Inventor: Forest J. Savoie, Rte. 1, Box 365, Cut Off, La. 70345

[21] Appl. No.: 678,684

[22] Filed: Apr. 20, 1976

[51] Int. Cl.² ............................................. A01K 73/02
[52] U.S. Cl. ............................................................ 43/9
[58] Field of Search .................. 43/9, 8, 7, 100, 103, 43/104, 55, 14

[56] References Cited

U.S. PATENT DOCUMENTS

| 3,015,903 | 1/1962 | Willingham | 43/9 |
| 3,195,261 | 7/1965 | Luketa | 43/9 |
| 3,440,752 | 4/1969 | Minter | 43/9 |
| 3,919,803 | 11/1975 | Manquso | 43/55 |

*Primary Examiner*—Warner H. Camp
*Attorney, Agent, or Firm*—Clarence A. O'Brien; Harvey B. Jacobson

[57] ABSTRACT

A conventional type fish net of webbing material usually of substantial length and having one end which is either closed or closeable, with the other end being open, mountable and attachable to a fishing vessel to which a fish hatch has been added. This fish hatch includes a main flotation body which has a central aperture therein and projecting flanges along the outer circumference thereof for attachment by binding and the like to an opening cut into the side of the fish net. Preferably this is the upper side as the fish net is mounted on the fishing vessel for trolling purposes. A hinged flap is provided on one side of the fish hatch and the hinged flap has openings therein corresponding in size to the webbing of the fish net, that is, of openings which are no larger in size than the apertures of the fish net. This cover closure member is hinged with a built in hinge stop edge for the purpose of keeping the flap opening partly open during a stage of the trolling operations. The fish hatch will normally permit the trash type marine life to escape from the net while retaining the desired shrimp therein.

10 Claims, 4 Drawing Figures

ESCAPE HATCH FOR FISH NET

BACKGROUND OF THE INVENTION

1. Field of the Invention

This invention relates generally to escape hatches for fishing nets used to catch shrimp while being trolled from fishing vessels. The trap will permit undesired trash-type marine life to escape while retaining the desired shrimp within the net.

2. Description of the Prior Art

A common problem with known type fishing nets as used in trolling operations to catch shrimp, is that a great quantity of undesired marine life such as crabs, fish, etc., are also caught in the net as presently used, and once the net is hauled aboard the fishing vessel it is necessary to separate the desired shrimp catch from the undesired trash. Many times in this process the undesired trash in the marine life is wasted or destroyed which ecologically is quite bad.

Also, the extra handling and sorting required is a great chore for the fishermen involved in performing same. Some means for permitting the undesired trash marine life to escape while retaining the desired shrimp is highly desirable.

Known prior art U.S. Pat. Nos. which may be pertinent to this invention are as follows: 712,494, Nov. 4, 1902; 742,160, Oct. 27, 1903; 614,879, Nov. 29, 1898; and 1,548,413, Aug. 4, 1925. None of these known prior art devices offers the new and unique features of the invention disclosed herein.

SUMMARY OF THE INVENTION

An object of the present invention is to provide an escape hatch for a fish net which will permit undesired trash type marine life to escape while retaining the desired species of marine life within the fish net.

Another object of the present invention is to provide an escape hatch which may be readily attached to existing conventional type fishing nets as used by fishing vessels. This structure is readily produced and marketed as a separate, distinct item for easy and ready attachment by fishermen to their existing fishing nets.

A further object of this invention is to provide an escape hatch which may be incorporated with new fishing nets as they are initially produced and distributed.

A still further object of this invention is to provide an escape hatch which is provided with flotation means to assist the hatch in floating in an uppermost position in the water and as attached to a fish net.

A still further object of this invention is to provide an escape hatch having a closure cover which is so arranged as to be partially open during a portion of the trolling operation in order to permit the escape of undesired marine life while retaining desired species within the overall fishing net combination.

An additional, still further object of this invention is to provide a flotation type structure which will assist in the overall fish catching operation of the net with which it is associated and permit undesired trash type marine life to escape while retaining desired species. Means are provided for ready attachment of the escape hatch to new or existing fish nets together with closure means for semi-automatic operation to open and close the main aperture of the escape hatch.

The escape hatch and fish net combination as disclosed herein has many advantages over conventional type fishing nets without said hatch. An important advantage of this combination is that trash marine species such as crabs, fish, etc., normally caught in large amounts within a conventional net as being trolled by conventional fishing vessels, are permitted to swim out of the open fish hatch while retaining the desired marine species such as shrimp within said net.

Another important feature is that the escape hatch is formed of buoyant material which is preferably made of a polyethylene alloy for strengthened durability purposes in addition to the desired flotation.

The escape hatch is provided with a cover closure structure which will semi-automatically open or close during the overall operation of the fishing net in order to retain desired species of marine life within the net and yet permit undesired species to swim out of said net.

Another important feature of this invention is in the hinge construction of the cover closure together with the complementary hinge portion on the main flotation body of the escape hatch to permit only a partial opening of the cover relative to the main body structure.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
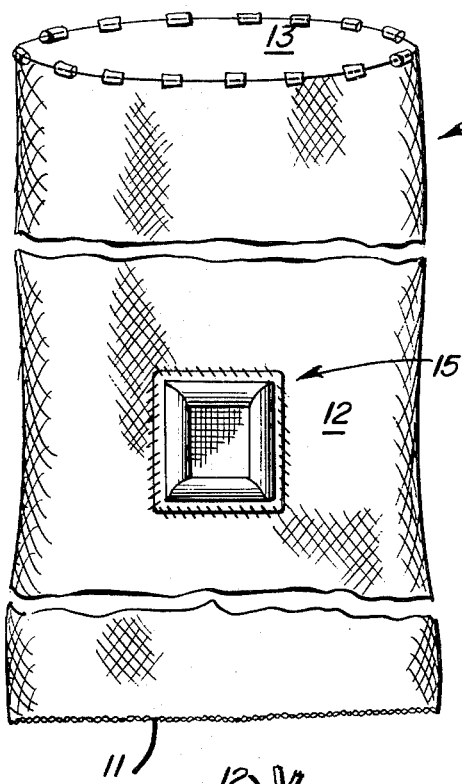
FIG. 1 is a top plan view of the escape hatch of this invention as in combination with a fish net.

Referring to FIG. 1 of the drawings, reference numeral 10 indicates, in general, the escape hatch of this invention as in combination with a conventional type fishing net as used in trolling operations to catch shrimp and the like.

The net 12 is generally of longitudinal construction and fairly long length having an open end 11 which is closeable. This end normally is the furtherest from the fishing vessel as the net is being pulled through the water while the other end 13 which is attached to the fishing vessel by the usual means is open for allowing the desired, as well as undesirable, marine life to be caught within the net as the overall net is being pulled through the water.

As contemplated by this invention, along the upper surface of the longitudinally extending fish net is mounted, by appropriate cutting and opening of the upper surface of the fishing net, the escape hatch, indicated generally by numeral 15 in FIG. 1. This hatch is laced or otherwise attached to the webbing 12 of the fishing net. The webbing 12 is of conventional knit or woven construction, as is conventional in fish nets of this type, and of appropriate opening size to retain the desired species of the marine life to be caught.

This invention envisions the escape hatch being attached to existing conventional type fishing nets, in addition to being applied at the factory as new installation of fish nets as they are initially produced, prior to distribution and sale thereof.

Figure 2:
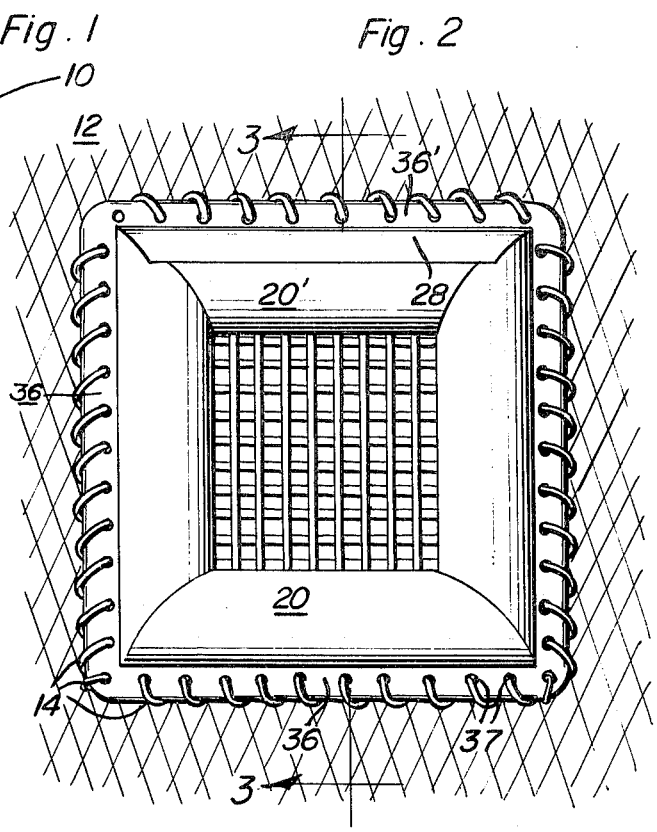
FIG. 2 is an enlarged view of the escape hatch as shown in FIG. 1.
Figure 3:
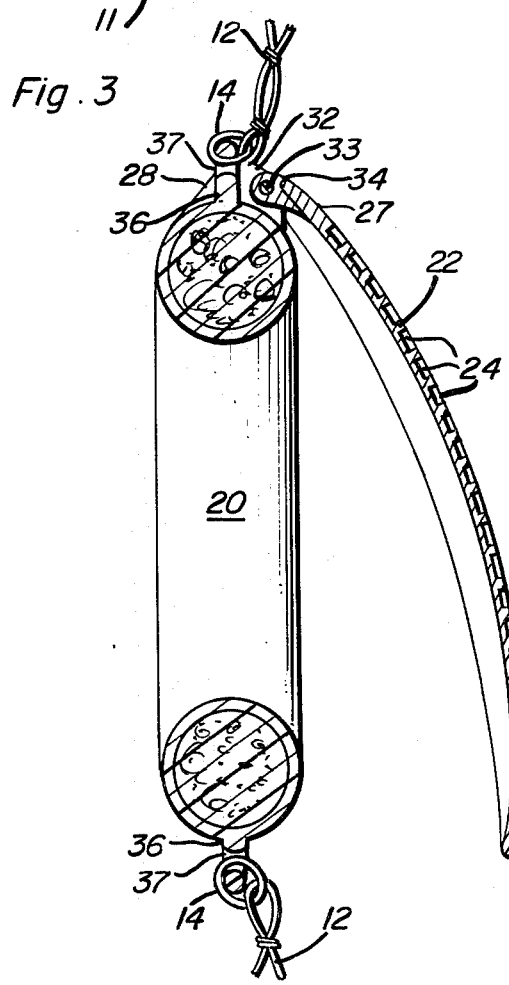
FIG. 3 is a cross-sectional view taken generally along line 3—3 of FIG. 2.

Looking at FIG. 2, the main support structure of the escape hatch may be seen. This structure 20, as shown, comprises a square basic member having a substantially square opening therethrough. As seen in FIG. 3 in cross-section, the main support structure is circular in shape and, as shown, is of solid construction, but may be of semi-solid construction having a central hollow portion therein, for holding air or other buoyant medium.

Preferably the solid structure is made of a polyethylene composition or alloy which is buoyant and yet strong and durable.

An extending flange 36 is provided along the exterior circumference of the main hatch structure. This flange has appropriated holes 37 spaced at substantially equal distance therealong for attaching the hatch to the fish net. Conventional type lacing 14 may be used. The lacing is applied through the holes 37 and through the webbing of the fish net in a conventional type manner.

Figure 4:
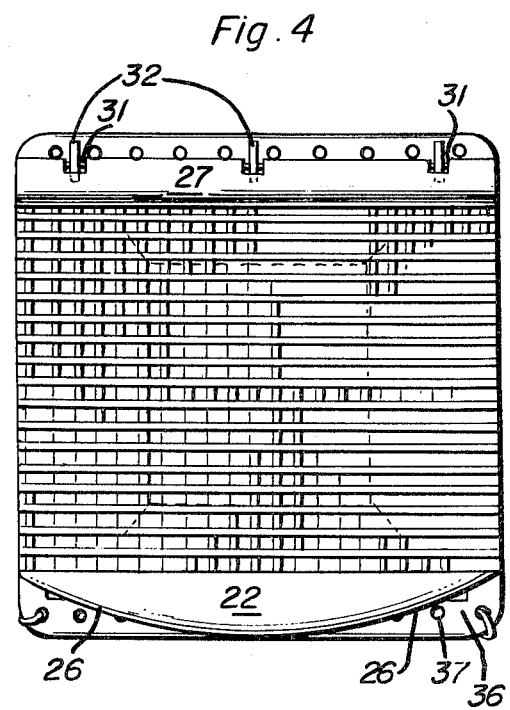
FIG. 4 is an elevational view looking at the closure cover and as viewed from inside of the net of FIGS. 1 and 2.

Looking at FIGS. 3 and 4, the hinge structure for the cover closure 22 may be seen. The cover 22 has recessed slots 31 provided at appropriate points along the upper edge 27 for reception of the projecting, complementary hinge members 32 provided on the upper flange 36 of the main escape structure. A single longitudinal pin 33 is provided to hold the plurality of hinge points together.

A feature of this hinge construction is the edge 34 provided on the upper side 27 of the cover closure plate which permits only partial opening of the cover closure. The purpose of this is so the cover can never open too wide, i.e., beyond the point that the force of the moving water, as in trolling, will semi-automatically effect closure of the cover. Appropriate openings 24 are provided in the cover closure for permitting water passage therethrough and yet preventing the passage of marine species therethrough. Opposite the straight hinge edge 27 of the cover closure is a streamlined curved opposite edge 26, as best seen in FIG. 4.

As mounted for use, as shown in FIG. 1 and as may be envisioned by looking at the cross-section of FIG. 3, as the net is being pulled through the water to entrap both desired and undesired species of marine life therein, the cover 22 will be forced closed by the pressure of the water against same. Then when the fishing vessel slows or stops, the cover will open, or partially open by the force of gravity thereon and the more active species of fish and crabs, etc., may escape out the partially opened cover closure 22 and through the opening in the center of the main escape hatch structure 20. Thus most of the remaining catch will be the desired shrimp with the trash being permitted to escape out the hatch.

It has been found in practice that an escape hatch having a flotation collar 20, approximately 12½ inches wide by approximately 13½ inches deep and of approximately 2 inch diameter in cross-section, is quite effective in practice.

The wall thickness of the flotation collar in the case of an air fill type may be 3/16 to ¼ inch in thickness. The outer flange 36 is normally ½ inch or more in projection length with the holes of ¼ inch to 5/16 diameter and spaced approximately 1 inch on center.

The upper portion of the flotation collar which is closest to the net opening and the fishing vessel, is also provided with a tapered beveled edge 28, to form a smooth transition from the net attached to the upper flange 36' and the outer upper surface of the flotation collar 20. This is to prevent the hatch from catching on the deck edge as the net is hauled aboard the vessel.

The closure cover is normally 12½ inches wide by approximately 14 inches deep from the edge 27 to the center point at the lower opposite edge 22 thereof. The cover closure has a reinforced edge for stiffness together with the stop hinge type construction as already described.

This escape hatch construction offers an important and advantageous modification to conventional fish net construction and usage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An escape hatch for a fish net, and the like comprising; a single piece main support structure of buoyant material having a center opening extending therethrough, first means for attaching the main support structure to an opening in the upper side of a fish net, the buoyant material keeping the main support structure in an uppermost position in the water as attached to the upper side of a fish net and second means for semi-automatically closing the central opening in the main support structure when the fish net is being trolled to catch marine life therein, including a closure cover attached to the main support structure by mounting means which will permit the desired closure action to take place.

2. The structure set forth in claim 1, wherein the mounting means of the second means includes additional means to permit semi-automatically limited opening of the closure cover for the main support structure when the fish net is at rest due to the force of gravity thereupon.

3. The structure as set forth in claim 2, wherein the mounting means of the second means includes a pivotal hinge structure for the closure cover which will permit complete closure of the opening in said main support structure due to the force of water flow against the closure cover when the fish net is being trolled through the water and then will permit only limited opening of the closure cover due to the force of gravity when the net is at rest so that the cover can not open too wide and past the point where further trolling action will again close the cover, and the pivotally mounted cover closure having small fish retention openings therein which will permit water flow therethrough.

4. The structure set forth is claim 3, wherein the main support structure is of substantially square configuration with the central opening therethrough being also of substantially square configuration, and the buoyant material is polyethylene material for both buoyancy and durability.

5. The structure as set forth in claim 4, wherein the closure cover has also a basically square configuration with a plurality of pivot hinge recesses along one straight edge and a diametrically opposite edge having a curved configuration, the pivotal hinge structure consisting of the main support structure having complementary hinge projections provided to mate with said pivot hinge recesses, a hinge pin for the pivotal connection, and a limit edge on the cover adjacent the hinge connection to limit the amount the cover can open.

6. The structure set forth in claim 5, wherein the first means for attaching the main support structure to a fish net opening consists of projecting flanges on the outer circumference of the main support structure, and said projecting flanges having a plurality of spaced apertures therein for reception of attachment means to connect the flanges with the opening in the fish net.

7. A fish net apparatus comprising a longitudinal trolling type fish net of web material, means for closing one end of said net, means for attaching the opposite open end to a fishing vessel, the improvement comprising a fish escape hatch means arranged in the net at an upper portion thereof and near the said open end of the net body, for blocking fish escape during the fish trolling operation due to the flow of water thereacross, and yet permitting undesired species of marine life to escape due to the force of gravity when the fishing vessel is substantially at rest.

8. The structure set forth in claim 7, wherein the fish hatch escape means includes a main flotation frame having a central opening therein, and semi-automatic closure cover means to effect the aforesaid function.

9. The structure set forth in claim 8, wherein the semiautomatic closure cover means includes a pivotally mounted apertured cover structure arranged on the main flotation frame by a limited opening hinge structure so as to be affected by water flow and gravity simultaneously and to prevent the cover structure from opening past the point where water flow thereacross cannot close the cover against the force of gravity during the fish trolling operation.

10. The structure as set forth in claim 9, wherein the main flotation frame is formed of buoyant material of polyethylene material for both flotation purposes to hold the frame substantially horizontally so the hinge structure can function properly as well as for strength and durability.

* * * * *